No. 873,830. PATENTED DEC. 17, 1907.
J. A. BECHTOLD.
HEDGE TRIMMER.
APPLICATION FILED SEPT. 13, 1907.
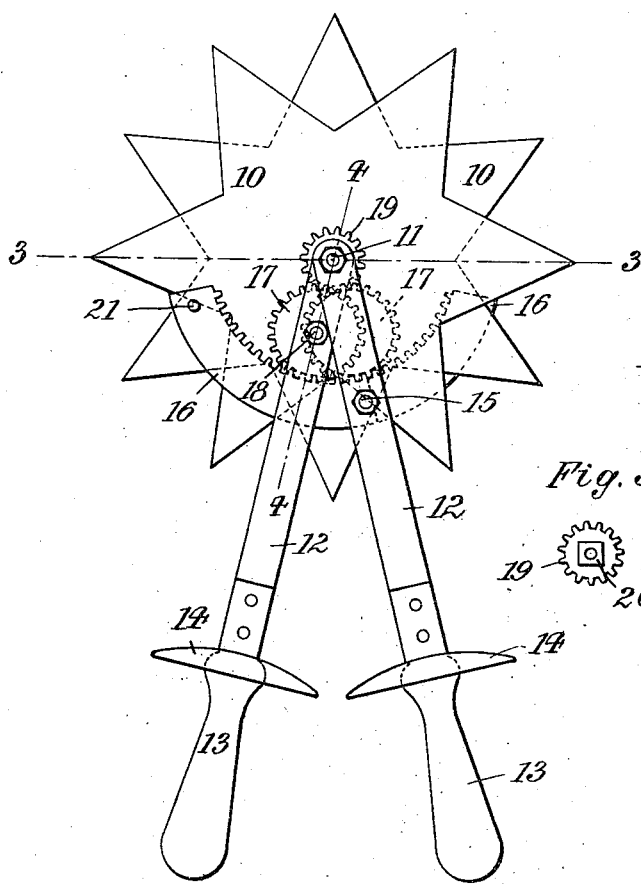
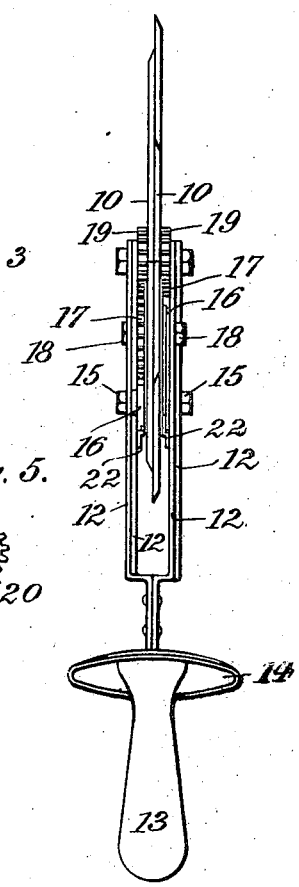
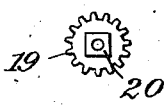
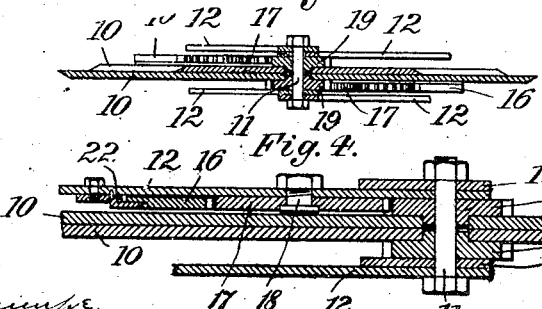

UNITED STATES PATENT OFFICE.

JOSEPH A. BECHTOLD, OF NEW YORK, N. Y.

HEDGE-TRIMMER.

No. 873,830.  Specification of Letters Patent.  Patented Dec. 17, 1907.

Application filed September 13, 1907. Serial No. 392,678.

*To all whom it may concern:*

Be it known that I, JOSEPH A. BECHTOLD, a citizen of the United States, residing at New York city, Brooklyn, county of Kings, and State of New York, have invented new and useful Improvements in Hedge-Trimmers, of which the following is a specification.

This invention relates to a hedge trimmer which operates with great rapidity and accuracy, and readily severs twigs, stems and other thicker portions of the hedge.

In the accompanying drawing: Figure 1 is a plan view of my improved hedge trimmer; Fig. 2 a side elevation thereof; Fig. 3 a section on line 3—3, Fig. 1; Fig. 4 an enlarged section on line 4—4, Fig. 1, and Fig. 5 a detail of one of the gear wheels.

The hedge trimmer comprises essentially a pair of stellated cutting blades 10 turning on a common spindle 11. Both edges of each of the star-points are sharpened to constitute knives. Blades 10 are straddled by a pair of forked shanks 12 turning on spindle 11 and terminating in handles 13 provided with guards 14. To each fork 12 is secured, by bolt 15, a segmental rack 16 passing through the other fork and into which meshes a pinion 17 fulcrumed at 18 to such other fork. Pinion 17 meshes into a gear wheel 19 fast on the face of one blade 10 and concentric to the eye thereof. In order to insure a reliable connection between gear wheel 19 and blade 10, the former is provided with a squared boss 20 sunk into a corresponding opening of the blade. Rack 16 is provided with a stop 21 that limits the angle to which handles 13 may be operated. A guide 22 within each fork 12 engages the outer edge of segment 16 passing through such fork.

The correlation of the parts is such that while rack 16 of one fork extends in one direction over the outer face of the first blade 10, rack 16 of the second fork extends in the opposite direction over the outer face of the second blade, (dotted lines, Fig. 1). When handles 13 are closed, racks 16 will, by pinions 17 and gear wheels 19, simultaneously rotate blades 10 in opposite directions, while when the handles are opened, the rotation of the blades is reversed, as will be readily understood. Thus by manipulating the handles, the protruding parts of the hedges projecting between the points of the stellated blades 10, will be severed in large numbers and with great rapidity.

I claim:

1. A hedge trimmer comprising a pair of stellated cutting blades, a spindle on which said blades are rotatable, a pair of handles turning on the spindle, and means actuated by the handles for simultaneously rotating the blades in opposite directions, substantially as specified.

2. A hedge trimmer comprising a pair of stellated cutting blades, a spindle on which said blades are rotatable, a pair of forked handles turning on the spindle, and means actuated by the handles for simultaneously rotating the blades in opposite directions, substantially as specified.

3. A hedge trimmer comprising a pair of cutting blades, a common spindle therefor, a pair of forked handles turning on the spindle, a curved rack and a pinion on each of the handles, the rack of one handle engaging the pinion of the other handle, and means for operatively connecting the pinions to the blades, substantially as specified.

4. A hedge trimmer comprising a pair of cutting blades, a common spindle therefor, a pair of forked handles turning on the spindle, a curved rack and a pinion on each of the handles, the rack of one handle engaging the pinion of the other handle, and gear wheels fast on the blades and engaged by the pinions, substantially as specified.

5. A hedge trimmer comprising a pair of cutting blades, a common spindle therefor, a pair of forked handles turning on the spindle, a curved rack, a pinion and a guide on each of the handles, the rack of one handle engaging the pinion and guide of the other handle, and means for operatively connecting the pinions to the blades, substantially as specified.

Signed by me at New York city, (Manhattan,) N. Y., this 12th day of September, 1907.

JOSEPH A. BECHTOLD.

Witnesses:
FRANK V. BRIESEN,
W. R. SCHULZ.